US008484499B2

(12) United States Patent
Moore et al.

(10) Patent No.: US 8,484,499 B2
(45) Date of Patent: Jul. 9, 2013

(54) APPLYING LOW POWER ENABLEMENT OF COMPUTING DEVICES TO PROCESS VOIP PHONE CALLS

(75) Inventors: Timothy M. Moore, Bellevue, WA (US); Warren Vincent Barkley, Mill Creek, WA (US)

(73) Assignee: Microsoft Corporation, Redmond, WA (US)

( * ) Notice: Subject to any disclaimer, the term of this patent is extended or adjusted under 35 U.S.C. 154(b) by 1543 days.

(21) Appl. No.: 11/626,736

(22) Filed: Jan. 24, 2007

(65) Prior Publication Data
US 2008/0175227 A1 Jul. 24, 2008

(51) Int. Cl.
G06F 1/00 (2006.01)
G06F 11/30 (2006.01)
H04L 12/66 (2006.01)

(52) U.S. Cl.
USPC ........... 713/324; 713/323; 713/330; 713/340; 370/352

(58) Field of Classification Search
None
See application file for complete search history.

(56) References Cited

U.S. PATENT DOCUMENTS

| 7,770,035 | B1 * | 8/2010 | John et al. ..................... 713/300 |
| 2006/0143583 | A1 * | 6/2006 | Diab et al. ......................... 716/4 |
| 2007/0155366 | A1 * | 7/2007 | Manohar et al. ............... 455/411 |
| 2007/0220280 | A1 * | 9/2007 | Karam et al. .................. 713/300 |
| 2008/0162682 | A1 * | 7/2008 | Ramachandran et al. .... 709/223 |

OTHER PUBLICATIONS

"Power over Ethernet Solutions—IP Telephony," ©2007 PowerDsine™ Ltd. <http://www.powerdsine.com/Solutions/IPTelephone.asp.>.

"White Paper on Power Over Ethernet (IEEE802.3af)—a Radical New Technology," [online], Power Over Ethernet—The Definitive Resource—Apr. 11, 2003, retrieved from www.PowerOverEthernet.com, pp. 1-4.

* cited by examiner

Primary Examiner — Faruk Hamza
Assistant Examiner — Andrew Oh
(74) Attorney, Agent, or Firm — Merchant & Gould (57) ABSTRACT

An apparatus and method for enabling a computing device to process VoIP phone calls while conserving the computing device's resources is disclosed. The apparatus comprises a computing device configured to use a minimum resource device and an internally integrated or externally connected minimum resource device. Components of the minimum resource device may or may not be powered by the computing device. A method for processing VoIP phone calls while conserving the computing device's resources uses a minimum resource device.

16 Claims, 5 Drawing Sheets

APPLYING LOW POWER ENABLEMENT OF COMPUTING DEVICES TO PROCESS VOIP PHONE CALLS

BACKGROUND

The Internet Protocol (IP) is a protocol that enables information to be routed from devices in one network to devices in another network. The communicating networks and devices may be dissimilar, as long as each supports the IP standard. The Internet, the global network of regional and local computer networks, is based on the IP standard.

One type of network that supports the IP standard is an Ethernet network. Ethernet is a widely used network communication standard for local area networks (LANs). Networks, e.g., LANs, that adhere to the Ethernet standard are called Ethernet networks. Ethernet networks enable computing devices, such as desktop computers, laptop computers, servers, printers, and so on, to communicate with each other.

It is also possible for properly configured telephonic devices to communicate over networks that support the IP standard. Voice over Internet Protocol (VoIP) is a standard that enables appropriately configured telephones, i.e., VoIP phones, to communicate over networks that support the IP standards, such as Ethernet networks. VoIP phones connected to the Internet through Ethernet networks enable callers to make and receive voice phone calls.

Network devices, such as desktop computers, laptop computers, servers, printers, facsimile machines, VoIP phones, etc., that are connected to an Ethernet network require power. Often the power is supplied by a power cable connected from the network device to an alternating current (AC) power outlet. Hence, it is often necessary that a network device be located near an AC power outlet and that a power cable be connected between the network device and the AC power outlet.

The Power over Ethernet (PoE) standard was developed to enable network devices to receive both power and communication over a single cable connected to an Ethernet-type device. PoE avoids the need for a power cable, thereby reducing cost. Further, eliminating the need for an AC power connection provides more device location options. In order to keep the power requirements of PoE power source equipment, i.e., the equipment that supplies power to PoE-enabled devices, at an acceptable level, PoE standards limit the power allotted to each PoE-enabled device to a predetermined level, presently 14 watts (W). In practice, the predetermined level of 14 W effectively limits the power available to each device to about 13 W.

VoIP phones requiring more power than the 13 W of power that PoE supplies may derive additional power from a computing device to which a VoIP phone is connected.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An apparatus and method for enabling a computing device to process VoIP phone calls while conserving the computing device's resources is disclosed. The apparatus comprises: a computing device configured to use a minimum resource device; and an internally integrated or externally connected minimum resource device. An exemplary minimum resource device comprises: a connector, such as a USB connector, for connecting the minimum resource device to the computing device; a speaker for converting an audio signal of a received portion of a VoIP phone call into audible sound; a microphone for converting the audible sound of a locally produced portion of a VoIP phone call into an audio signal; numeric entry mechanism, such as a keypad, for entering phone call numbers; and, preferably, a small display for displaying entered phone call numbers.

The speaker, microphone, keypad, and display of the minimum resource device are powered by the computing device. Depending on the nature of the computing device, the minimum resource device may or may not be powered by a battery in the computing device. Depending on implementation, the battery in the computing device may or may not be trickle charged through a PoE connection. Also, depending on implementation, the minimum resource device may or may not be powered by a universal power supply (UPS) connected to the computing device.

There are two stages to the use of a minimum resource device—setting up to process VoIP phone calls and processing VoIP phone calls. The first stage comprises: configuring a network port to receive a wake-up message, such as a Wake on LAN (WOL) magic message using VoIP software; placing the computing device into a sleep mode; and supplying power to the minimum resource device. The second stage comprises: in response to receiving a wake-up message; determining if the wake-up message indicates a VoIP phone call; if the wake-up message indicates a VoIP phone call, activating the minimum resource device; processing the VoIP call using VoIP software; when the VoIP call completes, placing the computing device into sleep mode; and supplying power to the minimum resource device.

Alternatively, the first stage may comprise: configuring a network port to receive a wake-up message using the VoIP software; configuring the computing device to operate in a sleep mode; placing the computing device into the sleep mode; and supplying power to a telephone-only circuitry component. The second stage of this alternative comprises: in response to receiving a wake-up message, determining if the wake-up message indicates a VoIP phone call; if the wake-up message indicates a VoIP phone call, activating the telephone-only circuitry component; processing the VoIP call using the VoIP software; when the VoIP call completes, placing the computing device into sleep mode; and supplying power to the telephone-only circuitry component.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

PoE power source equipment supplies power to PoE-enabled devices. In order to keep the power requirements of PoE power source equipment at an acceptable level, the PoE standard effectively limits the power allotted to each PoE enabled device to about 13 W. VoIP phones are a type of PoE-enabled device. Some VoIP phones are designed to be connected to computing devices capable of supporting VoIP phone calls. Such VoIP phones that require more power than the 13 W of power that PoE supplies may derive additional power from the computing devices to which the VoIP phones are connected. In the past, if such computing devices were shut down, the associated VoIP phone was also shut down, i.e., deactivated.

Figure 1:
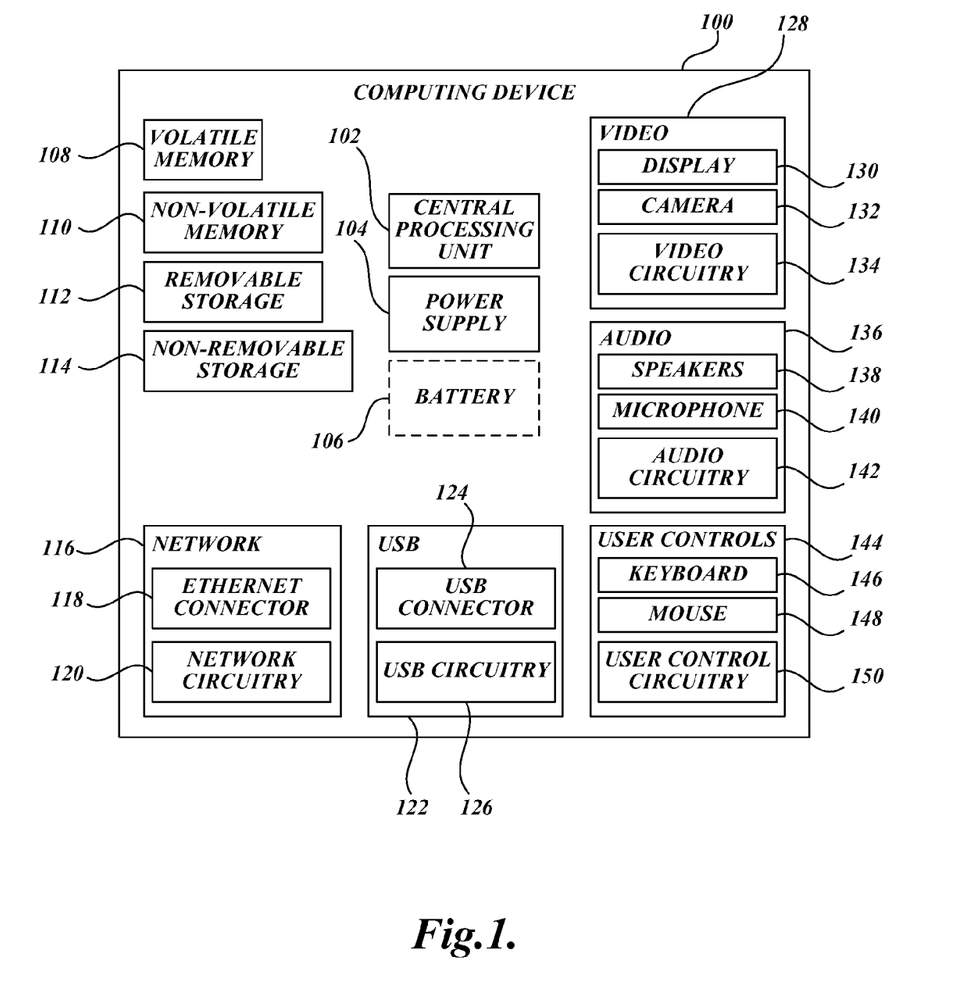
FIG. 1 a block diagram of an exemplary computing device that supports the processing of VoIP phone calls.

An exemplary computing device 100 that supports the processing of VoIP phone calls is illustrated in block diagram form in FIG. 1. The exemplary computing device 100 includes, but is not limited to, power, processing, memory, user controls, network, Universal Serial Bus (USB), audio and video components. The exemplary power components include an exemplary power supply 104 and an exemplary optional battery 106, as well as a conventional clock battery (not shown). The power supply 104 receives power from an external source (such as a 110V AC supply), rectifies, adjusts, and filters the power, and supplies the resulting PC power to the components of the computing device 100 requiring power. Depending on the computing device's type and power requirements, the optional battery 106 may also supply PC power to the components of the computing device 100 requiring power.

The processing components of the exemplary computing device 100 include a central processing unit (CPU) 102. The CPU 102 is powered by the power supply 104, and/or the optional battery 106. In a conventional manner, the CPU 102 reads data and instructions stored in the memory components of the exemplary computing device 100, which include volatile memory 108, non-volatile memory 110, removable storage 112, and non-removable storage 114. Typically, the CPU 102 executes instructions read from volatile memory 108 and non-volatile memory 110 and reads data from, and writes data to, the removable storage 112, and the non-removable storage 114.

The user controls components 144 of the exemplary computing device 100 to enable users to interact with the exemplary computing device 100. The illustrated exemplary user control components 144 comprise a keyboard 146, a mouse 148, and associated user control circuitry 150. Typically, the user control components 144 allow a user to input data and instructions that are received and processed by the CPU 102.

Network components included in the exemplary computing device 100 allow the exemplary computing device to communicate over a network, e.g., an Ethernet network. The exemplary network components 116 illustrated in FIG. 1 comprise an Ethernet connector 118 and an associated network circuitry component 120. The network component 116 provides a conduit for input and output data to pass between the CPU 102 and an Ethernet network. Typically, the CPU 102 receives and processes data received from the network via the network component 116 using instructions read from the volatile memory 108 and the non-volatile memory 110 and generates output data for sending to the network via the network component 116.

USB components included in the exemplary computing device 100 allow the exemplary computing device to communicate with devices externally connected to the computing device 100. The exemplary USB components 122 illustrated in FIG. 1 comprise a USB connector 124 and associated USB circuitry 126. User input devices such as those included in the user controls 144 may also be USB devices. Typically, the CPU 102 receives and processes data received from the USB components 122 using instructions read from the volatile memory 108 and the non-volatile memory 110 and generates output data that is sent to externally connected devices through the USB component 122.

Audio and video components included in the exemplary computing device 100 provide audio and video functionality. More specifically, the exemplary computing device 100 includes audio components 136 comprising speakers 138, a microphone 140, and associated audio circuitry 142; and a video component 128, comprising a display 130, a camera 132, and associated video circuitry 134. Audio signals received by the microphone 140 are converted to audio data by the audio circuitry 142. The CPU 102 receives and processes the audio data using instructions read from the volatile memory 108 and the non-volatile memory 110. Certain instructions may enable the CPU 102 to generate audio data that is converted into an audio signal by the audio circuitry 142 and applied to the speakers 138 to produce an audible sound. The camera 132 provides an video signal that is converted to video data by the video circuitry 134. The CPU 102 receives and processes the video data using instructions read from the volatile memory 108 and the non-volatile memory 110. Certain instructions may enable the CPU 102 to generate video data that is converted into a video signal by the video circuitry 134 and applied to the display 130 to produce a viewable image.

While the types of components included in the exemplary computing device 100 shown in FIG. 1 are included in most computing devices, some of the illustrated types may not be included in some computing devices. Other computing devices may include additional types of components. Hence, the types of components, as well as the quantity thereof, included in the exemplary computing device 100 shown in FIG. 1 should be construed as exemplary and not as limiting.

The computing device 100 shown in FIG. 1 is an example of a computing device capable of supporting VoIP phone calls. Preferably, the exemplary computing device 100 is able to support the processing of VoIP phone calls using a minimum amount of resources. While a computing device, such as computing device 100 shown in FIG. 1, may include components, i.e., resources, for power, processing, memory, user control, network, audio and video, not all of the components may be necessary to process VoIP phone calls. For example, most of the processing power and memory of such a computing device are not likely to be needed to process VoIP phone calls. Also, most of the user controls and most, if not all, of the video components may not be necessary. Intelligently deactivating the components, i.e., resources, that are not necessary to process VoIP phone calls allows a minimum amount of resources to be available to process VoIP phone calls. Minimizing resources, of course, minimizes the power required by a computing device to support VoIP phone calls.

The exemplary computing device 100 shown in FIG. 1 is enabled to process VoIP phone calls using a minimal amount of the computing device's resources by configuring the computing device to connect to, and interact with, a minimum resource device. An exemplary minimum resource device 200 is illustrated in FIG. 2.

Figure 2:
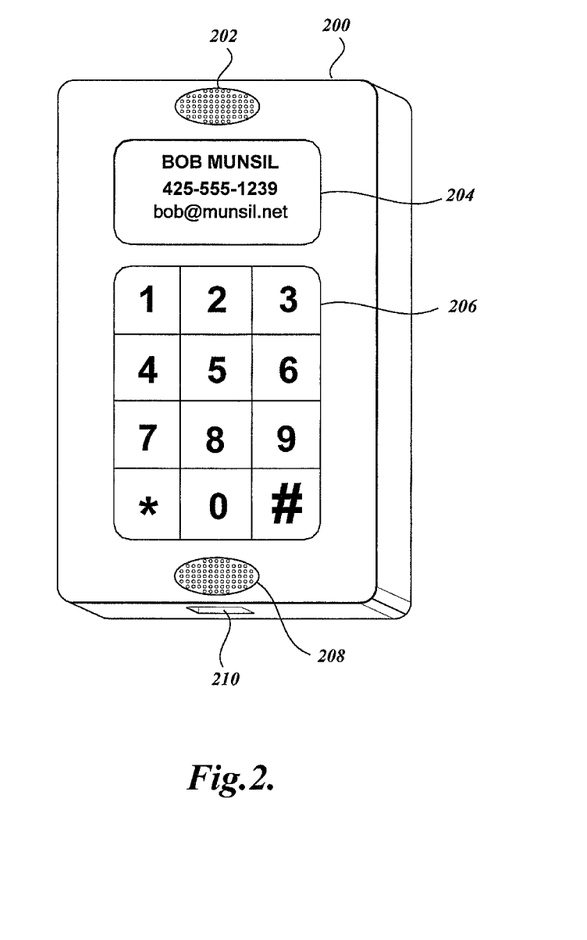
FIG. 2 is a pictorial diagram of an exemplary minimum resource device suitable for connection to a computing device to process VoIP phone calls.

The exemplary minimum resource device 200 illustrated in FIG. 2 is externally connected to the exemplary computing device 100 through a USB cable (not shown in FIG. 2) attached to a USB connector 210. In addition to the USB connector 210, the minimum resource device includes a speaker 202, a small display 204, a conventional 3×4 numeric keypad 206, and a microphone 208. Telephone numbers may be entered via the numeric keypad 206 to initiate a phone call. Dialed telephone numbers and other minimal information, such as the name of the called party, may be viewed on the small display 204. In the case of a received call, the name of the calling party and his telephone number may be displayed. During a VoIP phone call, sound is received by the microphone 208 and converted to an audio signal. The audio signal is sent to the audio circuitry 142 of the exemplary computing device 100 shown in FIG. 1 through the USB cable connected to the USB connector 210. The audio circuitry 142 of the computing device 100 interacts with the CPU 102 to produce data packets suitable for transmission over a network using the network component 116. In reverse fashion, data packets received from the network component 116 are converted to audio signals by the interaction of the audio circuitry 142 and the CPU 102. The audio signal is sent to the minimum resource device 200 through the USB cable connected to USB connector 210. The audio signal is reproduced as an audible sound by the speaker 202.

Figure 3:
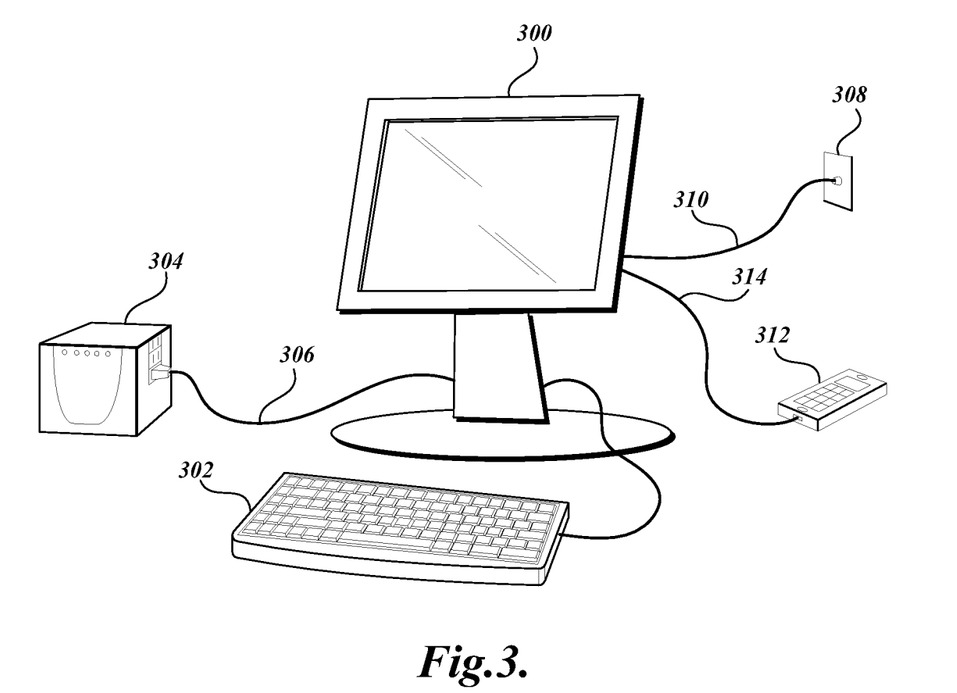
FIG. 3 is a pictorial diagram of an exemplary desktop computer connected to an exemplary external power supply and an exemplary minimum resource device suitable for processing VoIP phone calls.
Figure 4:
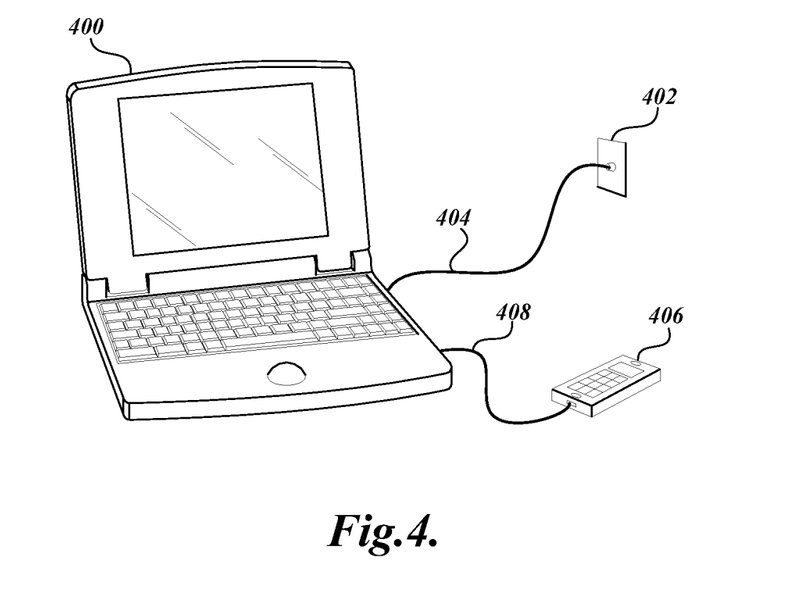
FIG. 4 is a pictorial diagram of an exemplary laptop computer connected to an exemplary minimum resource device suitable for processing VoIP phone calls.

Examples of computing devices configured to externally connect to minimum resource devices are illustrated in FIGS. 3 and 4. FIG. 3 is a pictorial diagram illustrating an exemplary minimum resource device 312 connected to an exemplary desktop computer 300. An exemplary keyboard 302 is also illustrated as connected to the desktop computer 300. The desktop computer 300 is shown connected to a network, e.g., an Ethernet network, through an Ethernet cable, i.e., cable 310. The Ethernet cable is plugged into an exemplary Ethernet connector, i.e., connector 308, that is wall mounted. The desktop computer 300 is illustrated as powered by an uninterruptible power supply (UPS) 304 through a cable 306. Alternatively, the desktop computer may be powered by a conventional AC outlet. The desktop computer supplies power to the minimum resource device 312. It is also possible for the desktop computer 300 to receive PoE power from the Ethernet cable connector 308 and supply the power to the minimum resource device 312.

Computing devices with capabilities similar to a desktop computer may also be configured as shown in FIG. 3. Hence, the use of a desktop computer with a minimum resource device should be construed as exemplary and not limiting. Other external power supplies such as batteries, electrical generators, and so on may be used to provide power to computing devices such as desktop computer 300. Hence, using the UPS 304 or an AC outlet to provide power to the desktop computer 300 also should be construed as exemplary and not limiting.

FIG. 3 illustrates how a minimum resource device 312 may be connected to a desktop computer 300. FIG. 4 illustrates how a minimum resource device 406 may be connected to a laptop computer 400. As is conventional, the exemplary laptop computer 400 contains an internal battery, not shown. As is conventional, the exemplary laptop computer 400 may be powered by a conventional AC power source or by the internal battery. The laptop computer 400 is connected to a network, such as the Ethernet network, via a cable 404, that plugs into a wall mounted network connector. Alternatively, the network connection may be a wireless connection. The minimum resource device 406 is connected to, and communicates with, the laptop computer 400 through a USB cable 408. The minimum resource device 406 is indirectly powered by the power source of the laptop computer 400 through the USB cable 408. In addition to the laptop computer battery or an AC source connection to the laptop computer, the minimum resource device 406 may be indirectly powered using PoE by trickle charging the battery of the laptop computer 400 through the cable 404 plugged into the wall-mounted network connector 402. Portable computing devices with capabilities similar to a laptop computer may also be configured as shown in FIG. 4. Hence, the use of a laptop computer with a minimum resource device should be construed as exemplary and not limiting.

FIGS. 3 and 4 illustrate examples of minimum resource devices externally connected to computing devices using cables. It is also possible for minimum resource devices to communicate with, i.e., "connect to," the computing devices wirelessly, using technologies such as Bluetooth. Bluetooth is radio frequency specification covering the wireless transmission of signals over short distances between telephones, computers, field equipment, household appliances, etc.

In addition to wired and wireless connecting a minimum resource device to a computing device, the minimum resource device may be physically integrated into the computing device as an integral component. For example, a minimum resource device could be integrated into the cover or beside the keyboard of a laptop computer (FIG. 4) or integrated into the keyboard of a desktop computer (FIG. 3). Hence, externally connecting a minimum resource device to a computing device should be construed as exemplary and not as limiting.

Figure 5:
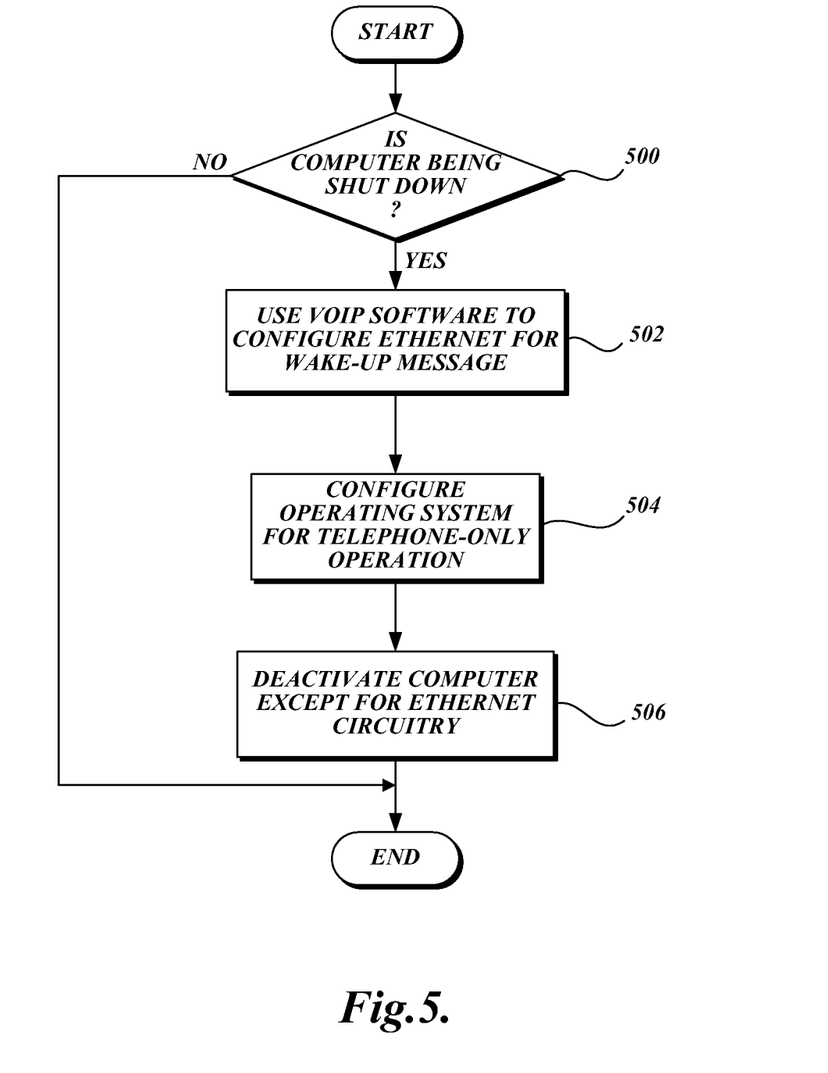
FIG. 5 is an exemplary functional flow diagram of an exemplary method of setting up an exemplary minimum resource device and computing device to process VoIP phone calls.
Figure 6:
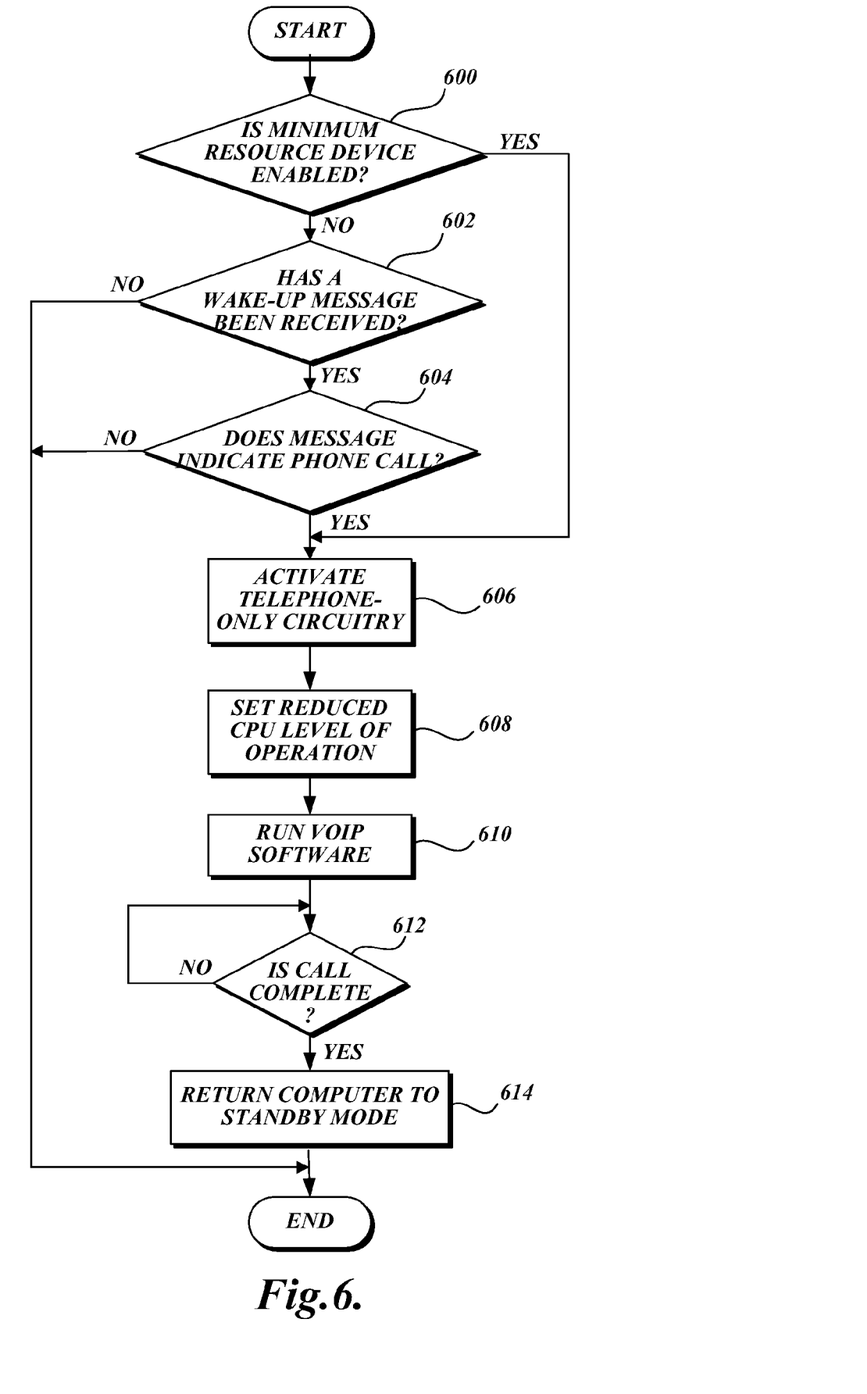
FIG. 6 is an exemplary functional flow diagram of an exemplary method of processing VoIP phone calls using an exemplary minimum resource device.

A minimum resource device, such as the minimum resource devices 200, 312, and 406 described above and illustrated in FIGS. 2, 3, and 4, respectively, may provide VoIP call processing while a computing device to which the minimum resource device is connected is in a standby mode, i.e., in a suspended, low power state. FIGS. 5 and 6 are functional flow diagrams of an exemplary method for accomplishing this result. More specifically, FIG. 5 illustrates an exemplary set-up process or method, and FIG. 6 illustrates an exemplary processing method.

FIG. 5 begins at decision block 500 where a test is made to determine if the computer is being shut down. If the computer is not being shut down, the method ends since the computer is powered and, as a result, power is available to operate the minimum resource device. If the computer is being shut down, control passes to block 502. At block 502, VoIP software is used to configure Ethernet circuitry, such as the network circuitry component 120 shown in FIG. 1, to respond to a wake-up message, such as a Wake-on-LAN (WOL) magic message. Part of the process of configuring the network circuitry component 120 may include configuring a network port, such as an Ethernet port.

As known to those skilled in the art, a WOL magic message is a network data packet that contains a certain byte-sequence that, when recognized by a receiving WOL compliant computing device, causes the WOL compliant computing device to switch on. A WOL compliant computing device has a WOL compliant network interface card (NIC) and motherboard. An exemplary WOL compliant motherboard has a WOL connector near the motherboard's Peripheral Component Interconnect (PCI) slots and includes firmware support for WOL activation. An exemplary WOL compliant NIC includes a WOL connector. When a WOL compliant computing device shuts down, the NIC continues to receive power and remain connected to a network. When a WOL magic message, i.e., a wake-up message, arrives, the NIC checks the magic message for the appropriate information and powers up the computing device if the information is present and valid.

Returning to FIG. 5, at block 504, the operating system is configured for telephone-only operation by, for example, loading instructions to activate a "telephone-only circuitry component" if a wake-up message is received. An exemplary minimal telephone-only circuitry component comprises at least one of the speakers 138, the microphone 140, the audio circuitry 142, the network circuitry 120 such as a NIC, the CPU 102, and sufficient computing resources on the host computer, such as portions of the volatile memory 108, to operate the VoIP software. When the telephone-only circuitry component is activated, a call may be received. It is also possible to place a call using the minimal telephone-only circuitry component by voice commands. By configuring the operating system for telephone-only operation, the telephone-only circuitry component is activated when a wake-up message is received while the remaining components remain deactivated.

At block 506, the computer is deactivated except for the network circuitry such as the network circuitry component 120. Then the method ends. Preferably, deactivating the computer places the computer in a sleep, suspend, or hibernate state. While the computer is deactivated, the method or process for processing VoIP calls illustrated in FIG. 6 is enabled.

FIG. 6 is an exemplary functional flow diagram of an exemplary method employed by an exemplary computing device, such as the desktop or laptop computers illustrated in FIGS. 3 and 4, to process VoIP phone calls received or transmitted by a minimum resource device, such as the exemplary minimum resource devices 200, 312, and 406 shown in FIGS. 2, 3, and 4, respectively. The minimum resource device, in effect, functions as a handset. As is well known, a traditional handset is a component of a telephonic device that comprises a microphone and speaker that rests on a switch when deactivated. When the handset is lifted off of the switch, the telephonic device is activated, allowing a telephone call to be placed. If the handset is placed on the switch, the telephonic device is deactivated. The functions of a handset and a switch are provided by the minimum resource device. The speaker 202 and microphone 208 perform the functions of the speaker and microphone of a traditional handset. The switching function can be provided by one of the keys of the keypad 206. For example, when the button on the keypad 206 is pushed, the minimum resource device 200, shown in FIG. 2, is activated.

The method for processing VoIP phone calls illustrated in FIG. 6 begins at decision block 600. At decision block 600 a test is made to determine if the minimum resource device is activated. If the minimum resource device is activated, control flows to block 606. If the minimum resource device is not activated, control flows to decision block 602. At decision block 602, a test is made to determine if a wake-up message, such as a WOL magic message, has been received. If a wake-up message has not been received, the method ends. If at block 602 a wake-up message has been received, control flows to decision block 604. At decision block 604, a test is made to determine if the wake-up message indicates that a phone call has been received. If the wake-up message does not indicate that a phone call has been received, the process ends. If the wake-up message indicates that a phone call has been received, control flows to block 606. At block 606, the telephone-only circuitry component is powered up. Next, at block 608, a reduced level of CPU operation is set. Depending on the power management capabilities of a CPU, reducing the level of operation may involve reducing the clock frequency of the CPU, deactivating portions of the CPU, and/or other power saving strategies. At block 610, the VoIP software is run. Running the VoIP software allows the telephone call to take place. Then, at decision block 612, a test is made to determine if the call is complete. If the call is not complete, the control loops back to decision block 612. When the call is complete, control flows to block 614 where the computing device is returned to standby mode. After block 614 the method ends.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for processing VoIP phone calls comprising:
   a computing device including:
      a central processing unit (CPU); and
      memory for storing instructions that, when executed, cause the CPU to:
         be placed in a low power consuming state that places the computing device in at least one of a sleep state, a suspend state, and a hibernate state while still powering a minimum resource device that consumes more power than provided by a Power over Ethernet (PoE) power source;
         become activated by a wake-up message; and
      the minimum resource device for sending and receiving VoIP phone calls comprising a microphone and a speaker that is coupled to the computing device that is separate from the computing device that is powered by the computing device when in the low power consuming state, wherein the sending and receiving VoIP phone calls are performed by the minimum resource device while the computing device is in the low power consuming state.

2. The system of claim 1 wherein the minimum resource device further includes:
   a connector for connecting the minimum resource device to the computing device;
   a keypad for entering telephone numbers to initiate VoIP phone calls; and
   a small display for displaying the entered telephone numbers.

3. The system of claim 2, wherein the keypad is powered by the computing device.

4. The system of claim 2, wherein the display is powered by the computing device.

5. The system of claim 1, wherein the minimum resource device is externally connected to the computing device.

6. The system of claim 5, wherein the externally connected minimum resource device is physically connected to the computing device.

7. The system of claim 5, wherein the externally connected minimum resource device is wirelessly connected to the computing device.

8. The system of claim 1, wherein the minimum resource device is powered by a battery in the computing device.

9. The system of claim 8, wherein the battery in the computing device is trickle charged through a Power over Ethernet (PoE) connection.

10. The system of claim 1, wherein the minimum resource device is powered by an external power supply connected to the computing device.

11. A method of configuring a computing device that includes VoIP software to communicate VoIP phone calls using a minimum resource device, the method comprising:

placing the computing device in a sleep mode that places the computing device in at least one of a sleep state, a suspend state, and a hibernate state when the computing device is shut down;

configuring the computing device to respond to wake-up messages while in the sleep mode; and in response to the receipt of a wake-up message at the computing device while the computing device is in the sleep mode, supplying power to the minimum resource device used for sending and receiving VoIP phone calls that is coupled to the computing device and that is separate from the computing device that is at a level higher than provided by a Power over Ethernet (PoE) power source and activating the VoIP software on the computing device, wherein the sending and receiving VoIP phone calls are performed by the minimum resource device while the computing device is in the sleep mode.

12. The method of claim 11 wherein the wake-up message is a phone call to the minimum resource device.

13. The method of claim 11 wherein the wake-up message is a phone call placed by the minimum resource device.

14. A method of processing VoIP phone calls using a VoIP phone connected to a computing device, the method comprising:

in response to receiving a wake-up message determining if the wake-up message indicates a VoIP phone call;

if the wake-up message indicates a VoIP phone call, supplying power that is at a level higher than provided by a Power over Ethernet (PoE) power source to a separate minimum resource device, comprising a speaker and a microphone, coupled to the computing device suitable for communicating VoIP phone calls and activating VoIP software that was unpowered during a low power mode of the computing device that placed the computing device in at least one of a sleep state; a suspend state and a hibernate state;

processing the VoIP call using the minimum resource device and the VoIP software while the computing device is in the low power mode; and when the VoIP call completes, placing the computing device into sleep mode in which the VoIP software is deactivated and power to the minimum resource device is terminated.

15. The method of claim 14, wherein the power for powering the minimum resource device is derived from a battery internal to the computing device.

16. The method of claim 14, wherein the power for powering the minimum resource device is derived from an uninterruptible power supply (UPS).

* * * * *